Dec. 1, 1953 — A. J. WARNER ET AL — 2,661,388
PRIMARY CELLS
Original Filed Aug. 29, 1951
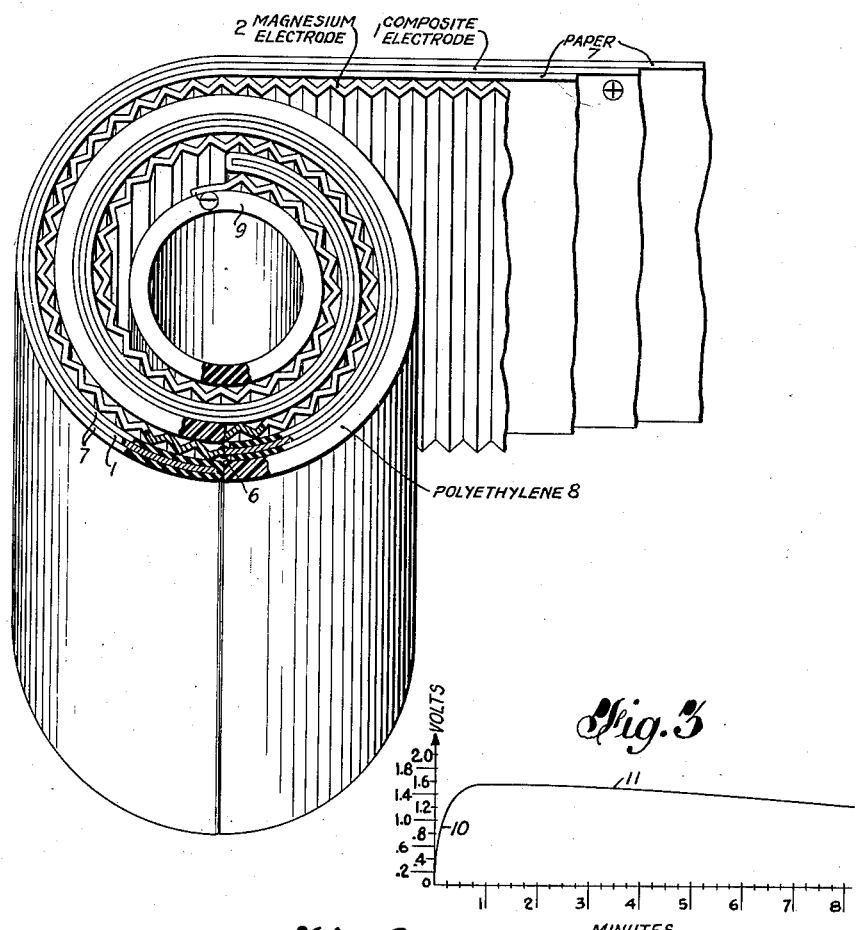
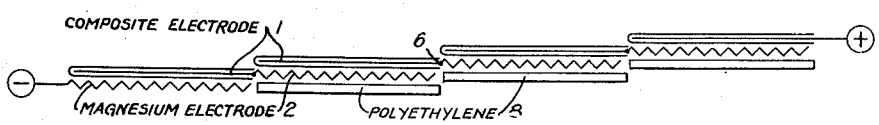
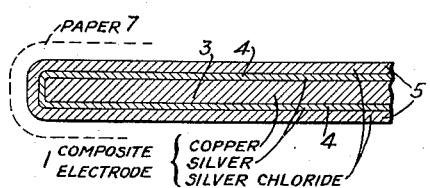
INVENTORS
ARTHUR J. WARNER
ANDRE R. GOBAT
BY
ATTORNEY Patented Dec. 1, 1953

2,661,388

UNITED STATES PATENT OFFICE 2,661,388

PRIMARY CELLS

Arthur J. Warner, Glen Ridge, and André R. Gobat, North Caldwell, N. J., assignors to Federal Telecommunication Laboratories, Inc., Nutley, N. J., a corporation of Delaware Original application August 29, 1951, Serial No. 244,136. Divided and this application May 6, 1952, Serial No. 286,334

17 Claims. (Cl. 136—100)

This invention relates to primary cells and more particularly to a deferred action type of electric cell which, when supplied with or immersed in an electrolyte, is ready for use. The present application is a division of our copending application, Serial No. 244,136, filed August 29, 1951.

Dry magnesium-silver halide primary cells have been proposed heretofore for storage in the dry state and later rendered operative by addition of a suitable electrolyte. These cells are useful in many applications but are expensive because of high silver content. Another disadvantage is the relatively high internal resistance of such cells.

One of the objects of this invention is to provide a primary cell of the magnesium-silver halide type which has a lower internal resistance than comparable magnesium-silver halide cells heretofore possessed.

Another object of the invention is to provide a deferred action primary cell having an unusually rapid voltage characteristic when supplied with electrolyte; and also one which provides a higher voltage than heretofore obtainable with magnesium-silver halide cells.

One of the features of the invention involves making the cathode of a base of relatively inexpensive conductive material, as compared with silver, with a coating thereon of a silver halide. By this construction a good conductive electrode is provided, thereby insuring a low internal resistance of the cell throughout its useful life. Also, by using relatively inexpensive conductive metals or alloys as a base, the base may be deeply etched or otherwise roughened prior to the application of silver, thereby enlarging the active surfaces of the electrode much more than is practical with a pure silver electrode.

An additional feature involves the method by which the silver halide is formed, whereby the electrode is rendered more reactive than silver halide electrodes heretofore processed. A silver coating is first applied by electro-deposition after which the silver is converted either partially or wholly into a silver halide, such as silver chloride. The crystals of the silver coating applied by electro-deposition are oriented substantially perpendicularly to the surface of the electrode. Where the silver is rolled, as is the case of a solid silver electrode or one clad with silver, the crystals are disposed for the most part substantially parallel to the surface of the electrode. This vertical orientation of crystals in accordance with the present invention not only enhances the chlorid- ing process but also results in a silver chloride layer that is much more reactive than silver chloride electrodes heretofore processed.

Another feature comprises making the anode of the cell of magnesium foil which is corrugated to not only provide spaces for quick admission of electrolyte to all surfaces of the electrodes and for rapid escape of gas but to also increase the useful surface thereof and to reduce strains. Still another feature is to provide the magnesium anode with an amalgam coating which resists action by moist atmosphere while the cell is in a dry state, and yet which greatly enhances cell action and insures a higher voltage output when the cell is supplied with electrolyte.

By using porous insulating and solid insulating spacers and rolling series connected strips of electrodes, a compact high voltage, high capacity, multi-cell battery is provided.

The above-mentioned and other features and objects of this invention and the manner of attaining them will become more apparent by reference to the following description taken in conjunction with the accompanying drawings, wherein:

Fig. 1 is a view in perspective of a cell assembly partially rolled in coil form with parts broken away showing details of a preferred embodiment in accordance with the principles of this invention;

Fig. 2 is a schematic illustration of a four-cell assembly prior to the rolling thereof into coil form;

Fig. 2a is a sectional view taken through the cathode;

Fig. 3 is a graph of a voltage curve for a single cell made in accordance with the principles of this invention.

Referring to Figs. 1, 2, and 2a of the drawings, the details of the electrodes and the multiple cell assembly are shown. Fig. 1 shows two cells assembled and partially rolled into coil form, while Fig. 2 illustrates diagrammatically four cells prior to being rolled. Each cell comprises a composite cathode 1 and an anode of magnesium 2. The cathode 1 comprises a strip of base metal 3 which preferably is of copper, although other conductive material may be employed, such as aluminum, iron, or alloys of each. The base strip is cleaned and etched to provide a rough surface, thereby increasing the capacity of the electrode. Silver 4 is applied electrolytically, the pre-requisite amount of silver necessary to provide for conversion to a silver halide layer 5 being thus supplied.

By electro-deposition the silver crystals are orientated substantially vertically with respect to the surface of the base. This vertical orientation of silver crystals not only enhances the haliding operation but also renders the silver halide highly reactive.

The halogen preferred is chlorine, and the chloriding is obtained electrolytically in a bath of sodium chloride, whereby silver chloride is formed. Other halides, such as bromide and iodide, may of course be used. In the chloriding of the silver, it is customary to control the chloriding operation so as to leave a thin layer 4 of silver beneath the chloride layer 5. This layer of silver prevents the base metal from being affected by the chloriding operation and from entering into the chemical reaction during use of the cell. In place of a thin coating of silver, a different metal barrier may be provided, such, for example, as gold or mercury. Where a special barrier layer is provided, prior to application of silver, all or substantially all of the silver subsequently supplied may be converted to a halide.

The magnesium electrode comprises a strip of magnesium or magnesium alloy in foil form. The magnesium foil is preferably corrugated so as to increase the useful surface thereof and also to relieve strains in the foil. The corrugations also permit rapid access to the surfaces of the electrodes of electrolyte when the cell is supplied with or immersed in electrolyte. The magnesium foil is preferably amalgamated by a treatment with a soluble mercuric salt followed by a fixing treatment. This treatment provides a magnesium amalgam coating over the magnesium electrode which resists the action of moisture in atmosphere coming in contact therewith prior to use of the cell. This coating, however, reacts quickly when supplied with a liquid electrolyte. It insures a rapid voltage rise and an ultimate voltage which is higher than normally obtainable by silver halide magnesium cells heretofore provided. By way of example the magnesium foil, after being cleaned and etched such as by immersion in a bath of acetic acid and sodium nitrate and suitably washed, may be treated by placing the foil in a bath of mercuric acetate and acetic acid. The proportions of this bath are not critical, the mercuric acetate, for example, may be in an amount between 5 to 100 grams per liter of solution, and the acetic acid may be in an amount of 2½ to 200 milliliters per liter of solution. The only pre-requisite is to provide sufficient mercuric ions in solution to effect a thin coating on the magnesium foil. Satisfactory ratio of these two ingredients used in practice is 30 grams mercuric acetate per liter of solution and 15 milliliters acetic acid per liter of solution. The immersion in this bath is for a short period of about 10 seconds at room temperature. The treated foil is next washed in water for about 30 seconds and then the coating is fixed by subjecting the foil to a bath of potassium dichromate for about 60 seconds at room temperature using in the neighborhood of 50 grams of potassium dichromate per liter of solution. The strength of this bath may be varied considerably depending upon the period of immersion and the temperature. This fixing operation is important since it insures a desired resistance for the electrode against action of moist atmosphere during the deferred action or storage period of the cell. After the fixing treatment the foil is washed with water, dipped in a bath of acetone, and dried, the acetone being used to enhance rapid drying. For further disclosure with regard to the amalgamating treatment, reference may be had to the copending application of A. R. Gobat, Serial No. 243,357, filed August 23, 1951.

The cathode and anode foil strips are soldered together in pairs, except for the terminal strips, as indicated at 6 by use of tin and tin-lead material. The anode of each cell, except for the one in the last cell, is connected in series with the cathode of the next succeeding cell, thus leaving the cathode of the first cell and the anode of the last cell unconnected as terminals. The cathodes are covered with a thin spacing material. These spacers may be of any suitable porous insulating material, such as cotton base paper, hemp or woven cotton, rayon, nylon fiberglass, or other fibrous substances. Interposed between adjacent cells are strips 8 of solid non-hygroscopic flexible electrical insulating material such as polyethylene, polystyrene, polytetrafluoroethylene, or polymonochlorotrifluoroethylene. For a four-cell assembly, three such strips are employed. If desired, one long strip may be substituted for the three strips 8. The assembly is rolled upon a tubular core 9 of vulcanized fiber or other insulating material.

Each cell assembly is provided with a protective casing of sheet steel, the cell material being insulated from the steel casing by a layer of varnished insulating cloth.

In Fig. 3 a voltage operating characteristic curve of a single cell is shown. The voltage buildup of the cell is illustrated by the substantially vertical portion 10 of the curve. When the cell is supplied with electrolyte, and the cell is discharged over a conductance of 0.14 mhos for each square decimeter of electrode surface, the voltage rise reaches about 1.2 volts in about 15 seconds, and at the end of one minute the voltage exceeds 1.5 volts. As shown by the duration portion 11 of the curve, the voltage remains above 1.375 during continuous discharge for a period of over 6 minutes after which it tapers off gradually. From the voltage characteristic curve of the cell, it will be observed that the cell made according to the present invention has an exceptionally rapid voltage rise and a substantially flat operating voltage for a prolonged period. Where four or eight cells are connected in series, the resulting voltage is accordingly multiplied. This exceptionally high voltage output and rapid voltage rise characteristic is believed due largely because of the vertical crystal orientation of the silver chloride layer. The composite form of the cathode also ensures a low internal resistance with a minimum of silver.

While we have described above the principles of our invention in connection with specific apparatus, it is to be clearly understood that this description is made by way of example only and not as a limitation to the scope of our invention, as set forth in the objects thereof and in the accompanying claims.

We claim:

1. A primary cell comprising a composite cathode having a base of a conductive material other than silver and a microcrystalline layer of a silver halide on said base, the crystals comprising said silver halide layer being oriented for the most part substantially perpendicular to the surface of said base, an anode of magnesium, and a porous electrical insulating material separating the cathode and anode.

2. A primary cell according to claim 1, wherein said base material is selected from a group of metals consisting of copper, aluminum, iron, and alloys of each of said metals.

3. A primary cell according to claim 1, wherein the silver halide is silver-chloride.

4. A primary cell according to claim 1, further including a barrier layer interposed between the base material and the layer of silver halide.

5. A primary cell according to claim 4, wherein said barrier layer is a material selected from the group consisting of silver, mercury and gold.

6. A primary cell according to claim 1, wherein the magnesium anode is provided with a coating of magnesium amalgam fixed thereon.

7. A primary cell comprising a composite cathode having a base of copper, an inner coating of silver electroplated on said base and an outer layer of microcrystalline silver-chloride, the crystals comprising said silver chloride layer being oriented for the most part substantially perpendicular to the surface of said base, an anode of magnesium and a porous electrical insulating material separating the anode and cathode.

8. A primary cell according to claim 7, wherein the magnesium anode is provided with a coating of magnesium amalgam fixed thereon.

9. A cathode for a primary cell comprising a base of conductive material other than silver and a coating including a microcrystalline layer of a silver halide, the crystals comprising said silver halide layer being oriented for the most part substantially perpendicular to the surface of said base.

10. A cathode according to claim 9, wherein said base material is selected from the group of metals consisting of copper, aluminum, iron, and alloys of each of such metals.

11. A cathode according to claim 9, wherein the coating includes a barrier layer between the silver halide and said base.

12. A cathode according to claim 11, wherein said barrier layer is a material selected from the group consisting of silver, mercury and gold.

13. A cathode according to claim 11, wherein the base is copper, the barrier is electroplated silver and the halide is silver chloride.

14. A primary cell comprising a composite cathode having a base of conductive material other than silver, a microcrystalline layer of silver chloride and a barrier layer of a material selected from the group consisting of silver, mercury and gold interposed between said base material and said microcrystalline layer of silver chloride, the crystals comprising said silver chloride layer being oriented for the most part substantially perpendicular to the surface of said base, an anode of magnesium and a porous electrical insulating material separating the cathode and anode.

15. A primary cell comprising a composite cathode having a base of conductive material selected from a group of metals consisting of copper, aluminum, iron, and alloys of each of said metals, a microcrystalline layer of silver chloride on said base and a barrier layer of a material selected from the group consisting of silver, mercury and gold interposed between said base material and said microcrystalline layer of silver halide, the crystals comprising said silver halide layer being oriented for the most part substantially perpendicular to the surface of said base, an anode of magnesium and a porous electrical insulating material separating the cathode and anode.

16. A primary cell comprising a composite cathode having a base of conductive material other than silver and a microcrystalline layer of silver halide on said base, the crystals comprising said silver halide layer being oriented for the most part substantially perpendicular to the surface of said base, an anode of magnesium having a coating of magnesium amalgam fixed thereon, said anode being corrugated, and a porous electrical insulating material separating the cathode and anode.

17. A cathode for a primary cell comprising a base of conductive material selected from the group of metals consisting of copper, aluminum, iron, and alloys of each of said metals, a microcrystalline coating of silver halide, the crystals comprising said silver halide layer being oriented for the most part substantially perpendicular to the surface of said base, and a barrier layer interposed between said coating and said conductive material selected from the group consisting of silver, mercury and gold.

ARTHUR J. WARNER.
ANDRÉ R. GOBAT.

References Cited in the file of this patent

UNITED STATES PATENTS

| Number | Name | Date |
|---|---|---|
| 1,771,190 | Polcich | July 22, 1930 |
| 2,050,173 | Gordon | Aug. 4, 1936 |
| 2,428,850 | Lawson | Oct. 14, 1947 |
| 2,441,896 | Moir | May 18, 1948 |
| 2,564,495 | Mullen | Aug. 14, 1951 |

OTHER REFERENCES

Publication: "The Electrochemical Society," pages 467–472, 1946.